UNITED STATES PATENT OFFICE.

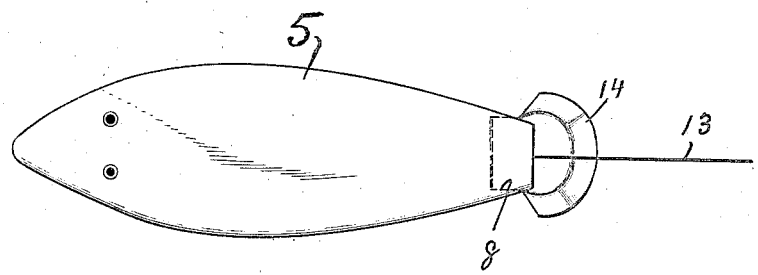
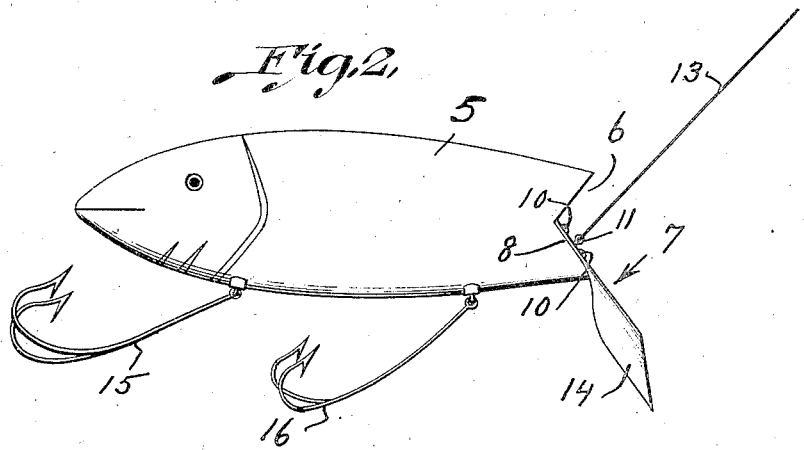
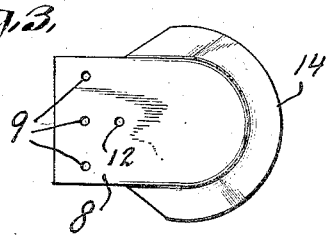

HARRY L. MEDLEY, OF LOS ANGELES, CALIFORNIA, ASSIGNOR OF ONE-THIRD TO HARRY G. HAMILTON, OF YOUNGSTOWN, OHIO.

ARTIFICIAL BAIT.

1,312,451.  Specification of Letters Patent.  Patented Aug. 5, 1919.

Application filed February 18, 1919. Serial No. 277,866.

*To all whom it may concern:*

Be it known that I, HARRY L. MEDLEY, a citizen of the United States, and resident of Los Angeles, in the county of Los Angeles, State of California, have invented certain new and useful Improvements in Artificial Bait, of which the following is a specification.

My invention relates primarily to what is termed wiggle bait to be used in deep sea fishing in trolling, and the object thereof is to provide bait of the above character which will work beneath the surface of the water and act in a natural and life-like manner.

I accomplish the above objects by the device described herein and illustrated in the accompanying drawings forming a part hereof in which:

Figure 1 is a top plan of my device.

Fig. 2 is a side elevation of Fig. 1.

Fig. 3 is an enlarged detail of a portion of my device.

In the drawings 5 represents the body of my bait, which is shaped to represent the body of a small fish such as the natural prey of deep sea fish, and has provided in the rear or tail portion thereof a substantially V-shaped notch 6, opening rearwardly. Secured upon the lowermost leg of said V-shaped notch to extend downwardly and rearwardly therefrom is my tail piece or member 7. Any suitable material may be used in constructing my invention although I prefer wood for the body member and metal for the tail member. My tail member 7 comprises a substantially flat portion 8 provided with apertures 9 therethrough by means of which it is attached in its position of use, nails 10 or the like being driven therethrough into the body member. A screw eye 11 is passed through an aperture 12 in said tail member and into the body member and provides means for attaching the bait to a fish line 13. Extending downwardly from portion 8 of tail member 7 is a flange or rim 14 which also flares outwardly, as best shown in Fig. 3, which is of such shape and angularity that as the current strikes against the same the fish will be caused to wiggle and otherwise produce a lifelike representation of a fish swimming.

Pivotally secured to the underside of body member 5 of my device are fish hooks 15 and 16 of the usual form.

In the use of my device it is first secured to the end of the fish line 13 by means of eye 11. It is then placed in the water and as the current flows past the same will impinge against the tail member and impart a lifelike motion thereto as above described.

Having thus described the invention, what I claim is:

1. In an artificial bait the combination with a fish like body having a rearwardly opening V-shaped notch at the rear end thereof, of a guiding plate having its medial portion secured to the lower leg of said V-shaped notch to extend parallel therewith with the edges of the guiding plate flared downwardly and outwardly beyond the sides of the body; and line attaching means extending from said medial portion.

2. In an artificial bait the combination with a fish like body having a horizontally extending rearwardly opening V-shaped notch in the rear end thereof, of a guiding plate having its medial portion secured upon the upper face of the lower leg of said notch to extend parallel therewith with the edges of the guiding plate extending outward and rearwardly from said body and flared downwardly and outwardly; line attaching means extending from said guiding plate; and downwardly depending hooks secured to said body.

In testimony whereof, I affix my signature in the presence of two witnesses.

HARRY L. MEDLEY.

Witnesses:
IRA H. MCMILLAN,
L. H. LIVERMORE.